United States Patent [19]

Wegener

[11] 3,860,254
[45] Jan. 14, 1975

[54] FOLDABLE PACKER

[76] Inventor: Harold William Wegener, 9122 Fletcher Dr., La Mesa, Calif. 92041

[22] Filed: Oct. 26, 1970

[21] Appl. No.: 83,799

[52] U.S. Cl. ............................... 280/36 R, 280/78
[51] Int. Cl. ........................................... B62b 11/00
[58] Field of Search ............ 280/36 C, 36 R, 37, 41, 280/47.3, 47.32, 47.33

[56] References Cited
UNITED STATES PATENTS

| | | | |
|---|---|---|---|
| 2,416,492 | 2/1947 | Neeley | 280/47.3 |
| 2,464,525 | 3/1949 | Nurney | 280/47.3 |
| 2,811,367 | 10/1957 | Goodale | 280/41 C |
| 2,918,296 | 12/1959 | Goodale | 280/47.3 |
| 2,979,338 | 4/1961 | Dwyer | 280/47.3 |
| 3,222,100 | 12/1965 | Lindzy | 280/36 C |
| 3,236,537 | 2/1966 | Eckman | 280/47.3 |

FOREIGN PATENTS OR APPLICATIONS 593,863  10/1947  Great Britain ................... 280/36 C

*Primary Examiner*—Robert R. Song

[57] ABSTRACT

This invention relates to new and useful improvements in a single wheel foldable packer vehicle specifically designed for use by one or two men in transporting moderate loads such as camping equipment, carcasses of game animals or disabled persons over rough terrain.

2 Claims, 4 Drawing Figures

PATENTED JAN 14 1975　3,860,254

HAROLD W. WEGENER

FOLDABLE PACKER

A main object of this invention is to provide a vehicle of the aforementioned character which may be easily and simply folded without tools into a compact unit, with no loose or unattached parts resulting before, during or after the folding operation.

A further object of this invention is to provide a land vehicle which folds by means of the main frame sections being hinged at the axle of the aforementioned single wheel.

A still further object of this invention is to provide a land vehicle which is relatively stable by nature of a low center of gravity when loaded.

A still further object of this invention is to provide a land vehicle in which the height of the handles may be varied in a simple manner to suit the convenience of the persons using the vehicle.

A still further objective of this invention is to provide a land vehicle which will be extremely rigid, strong and lightweight in construction, which has a minimum number of parts, which is economical to manufacture and which is convenient and easy to use.

Other objects and advantages will become apparent from a consideration of the following description and the appended claims in conjunction with the accompanying drawings wherein like numerals refer to like parts throughout, and in which:

In the accompanying drawings there is a cart 10 constructed to exemplify the principles of the invention. The cart is constructed from six components: two frame members generally designated as 12 and 14, a load-carrying platform generally designated as 16, a wheel 22, and two foldable supports generally designated as 18 and 20.

Figure 3:
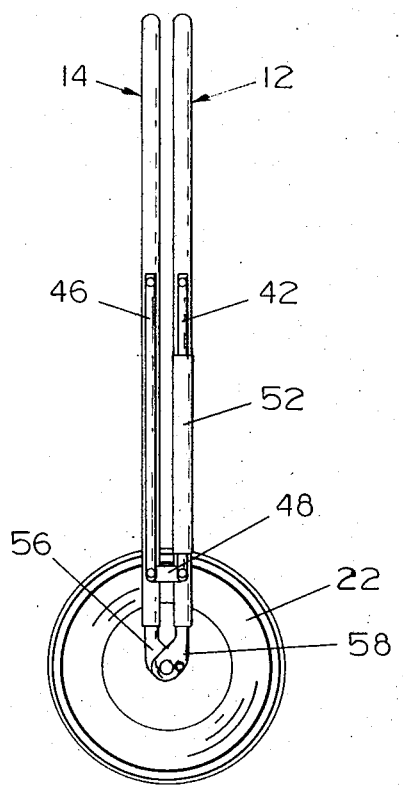
FIG. 3 is a view of the device in the folded position for transport or storage.
Figure 4:
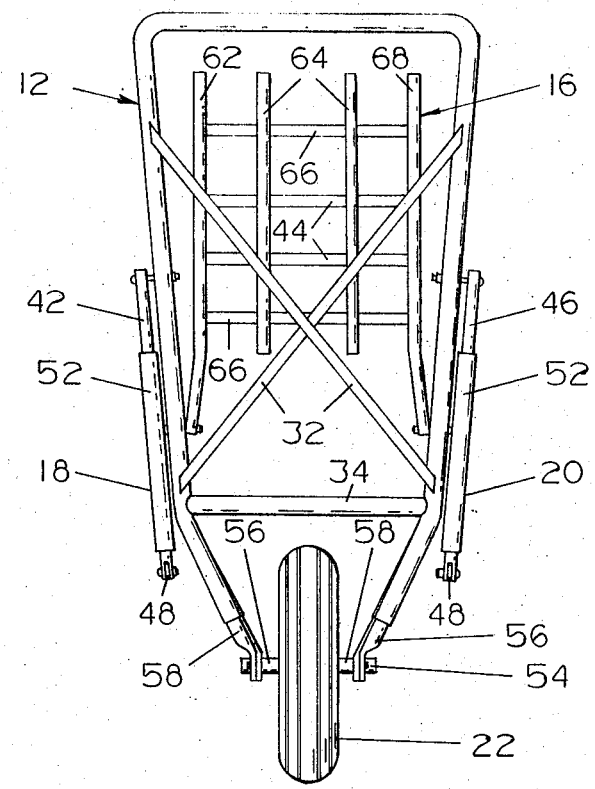
FIG. 4 is a side view of the device in FIG. 3.

The frame members 12 and 14 are essentially similar, and only frame member 12 will be described. The frame member is formed from suitable metal tubing into a modified U-shape. The closed end 30 of this shape forms a handle to be grasped by the operator of the vehicle. The sides 24 and 28 of the frame member converge gradually from the handle 30, and then converge at a greater rate to form the lower ends 36 and 38. End fittings 56 and 58 are welded to the lower ends 36 and 38 to form attachments for the single wheel 22. Offset of the holes in the end fittings 56 and 58 from the centerlines of frame ends 36 and 38 allows the frame members 12 and 14 to fold together without interference, as shown in FIG. 3.

Tubular brace member 34 is welded between the sides of the frame member 12 at approximately the point where the convergence rate of the side members 24 and 36, and 28 and 38, changes. The brace member 34 on frame members 12 and 14 adds rigidity and provides a support-rest for the load platform 16. Brace members 32 are formed from suitable tubular metal stock and are welded diagonally between the side members of frame members 12 and 14, to increase rigidity and to provide additional area to support loads carried on the vehicle. For frame member 12 only, side members 24 and 28 have holes to accept mounting fasteners for the swingably mounted load platform 16.

Figure 1:
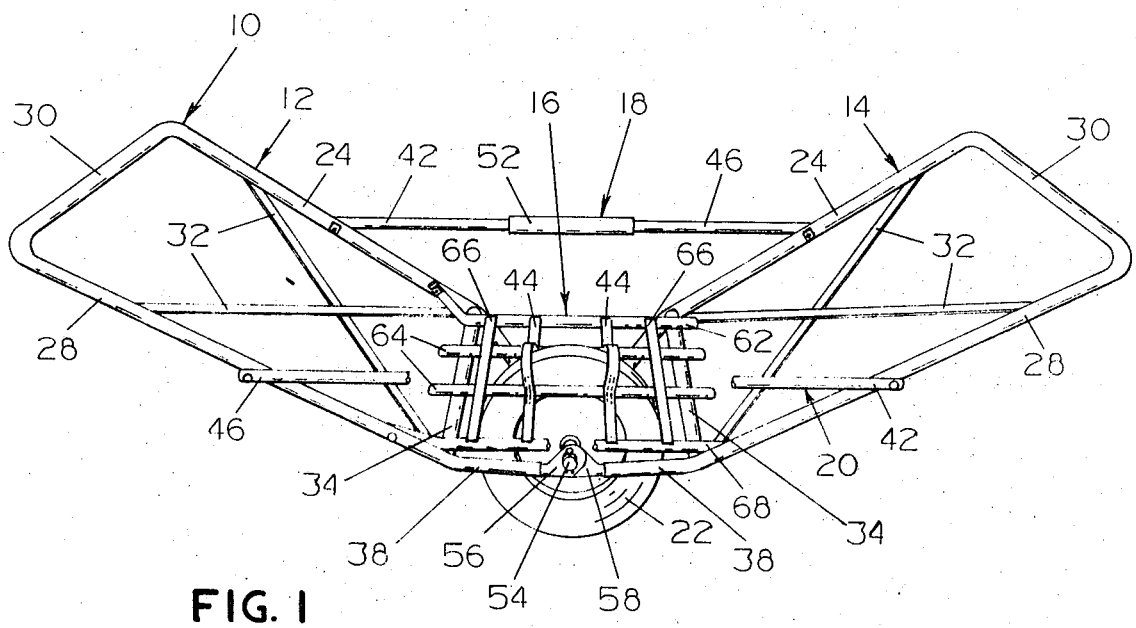
FIG. 1 is a perspective view of a single-wheel land vehicle constructed in accordance with the invention, and shown ready for use.

The load platform 16 is constructed from tubular longitudinal members 62, 64 and 68, held together by a plurality of metal strips 44 and 66 welded at right angles to the said members. The metal strips 44 are formed in a semicircular shape at the center of the load platform 16 to provide clearance for the single wheel 22. The load platform 16 is swingably mounted to frame member 12 by means of unnumbered bolts through member 62 and side 24, and through member 68 and side 28, in such a manner that longitudinal members 62, 64 and 68 are supported by horizontal cross members 34 on frame members 12 and 14, with the vehicle set up for use as shown in FIG. 1.

Figure 2:
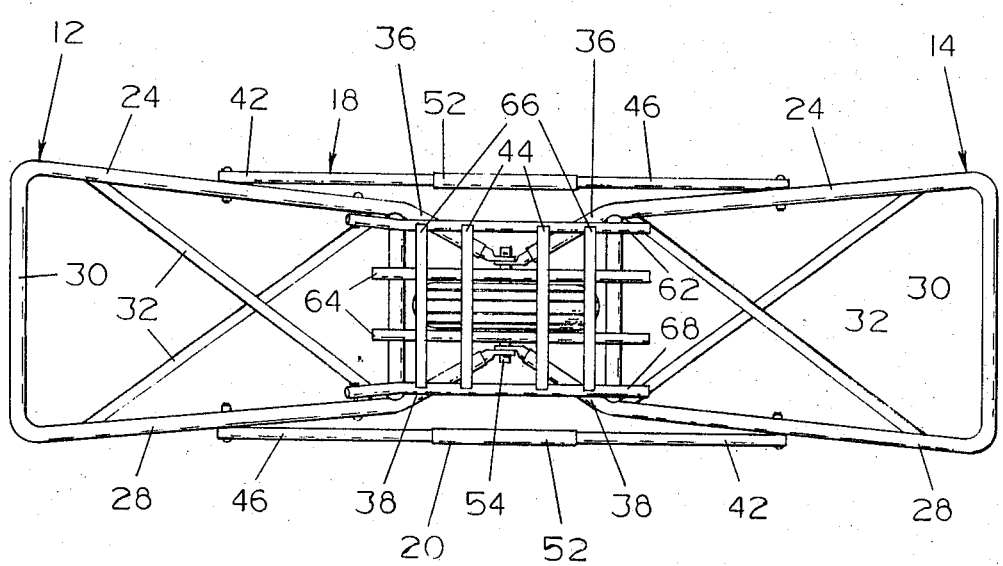
FIG. 2 is a top view of the device shown in FIG. 1.

The main frame members 12 and 14 are swingably mounted to the axle 54 of wheel 22. The said axle is rotatably mounted in the bearing hub of said wheel. The said frame members are secured to the axle by cotter pins. The said frame members are fixed in position relative to each other as shown in FIG. 1 by foldable support members 18 and 20. These members are similar, and only member 18 will be described. The tubular support member halves 42 and 46 of member 18 are hinged at the center by means of hinge link 48, which allows member 18 to fold when the cart is folded, as shown in FIG. 3. Sleeve 52 slides over said link 48 to make said member 18 a rigid member when the cart is in use as shown in FIGS. 1 and 2. The outer ends of member halves 42 and 46 are swingably mounted to sides 28 and 24 of frame members 12 and 14. When desired, the height of handles 30 may be varied by the selection from a plurality of holes in sides 28 and 24 for the aforementioned swingably mounted connection of member halves 42 and 46.

This construction allows the device to be quickly and easily folded or extended without tools and with a minimum of steps, at no sacrifice in strength or rigidity. Folding of the device from the position shown in FIG. 1 requires three simple steps: the load platform 16 is rotated so that it lies on frame member 12; the sleeves 52 of foldable support members 18 and 20 are moved to one side, leaving the said support members free to fold downward; the frame members 12 and 14 are brought together into the folded position shown in FIG. 3. Reversing these three steps places the device in the extended position.

Although I have described the principals of construction, function and operation of my invention in a preferred embodiment thereof, it is to be understood that obvious changes may be made within the scope of the following claims without departing from the spirit of my invention.

I claim:

1. A foldable and portable load carrying packer vehicle, comprising an axle having a single wheel journaled thereto; a pair of modified U-shaped main frame members each having a closed end and a converging open end; hinge means for hingedly connecting said open ends of said U-shaped main frames to said axle and for hingedly interconnecting said open ends about an axis parallel to said axle, said closed end of each of said main frame members forming a handle, said hinge means permitting said main frame members to be superposed relative to each other into a folded position and said handles to be rotated in circular arc away from each other into a unfolded operative position; a transverse brace rigidly connected to the legs of each of said U-shaped main frame members adjacent and parallel to said axle; a load carrying platform of a generally rectangular configuration hingedly connected adjacent one edge portion thereof to one of said U-shaped main frame members and pivotable about an axis parallel to said axle with the opposite edge portion thereof adapted to rest on said transverse brace of the other U-shaped main frame member when said packer vehicle is in said operative unfolded position; locking means operatively interconnecting said U-shaped main frame members for maintaining said packer vehicle in said operative unfolded position.

2. A packer vehicle as recited in claim 1, wherein said locking means including a pair of foldable support brace members each comprising a pair of tubular members joined by way of a double hinge link and pivotally connected at their free ends to respective said legs, and having a sliding tubular sleeve member slidable over said double hinge link to lock said foldable support brace member in a linearly aligned position, whereby there are no loose unattached parts or fastening devices at any time, before, during or after either folding or unfolding operation.

* * * * *